(12) United States Patent
Sanders et al.

(10) Patent No.: US 8,260,460 B2
(45) Date of Patent: Sep. 4, 2012

(54) INTERACTIVE ROBOT CONTROL SYSTEM AND METHOD OF USE

(75) Inventors: Adam M. Sanders, Holly, MI (US); Matthew J. Reiland, Oxford, MI (US); Muhammad E. Abdallah, Houston, TX (US); Douglas Martin Linn, White Lake, MI (US); Robert Platt, Houston, TX (US)

(73) Assignees: GM Global Technology Operations LLC, Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 367 days.

(21) Appl. No.: 12/564,096

(22) Filed: Sep. 22, 2009

(65) Prior Publication Data

US 2011/0071676 A1  Mar. 24, 2011

(51) Int. Cl.
*G06F 19/00* (2006.01)
*G05B 19/04* (2006.01)

(52) U.S. Cl. ...................................................... 700/245

(58) Field of Classification Search .......... 700/245–264, 700/900; 483/901; 901/1–18, 27–30, 34–36, 901/46
See application file for complete search history.

(56) References Cited

U.S. PATENT DOCUMENTS

| 5,341,459 | A  | * | 8/1994 | Backes ......................... | 700/260 |
| 7,113,849 | B2 | * | 9/2006 | Kuroki et al. ................. | 700/245 |
| 2004/0164697 | A1 |   | 8/2004 | Iribe |  |
| 2005/0240412 | A1 | * | 10/2005 | Fujita ............................ | 704/270 |
| 2006/0033462 | A1 |   | 2/2006 | Moridaira |  |
| 2006/0214621 | A1 |   | 9/2006 | Ogawa et al. |  |
| 2008/0071423 | A1 | * | 3/2008 | Murray et al. ................. | 700/250 |
| 2010/0010671 | A1 | * | 1/2010 | Miyamoto ..................... | 700/247 |

FOREIGN PATENT DOCUMENTS

| DE | 112004002219 T5 | 11/2006 |
| DE | 112006003044 T5 | 10/2008 |
| EP | 0923011 A2 | 6/1999 |

OTHER PUBLICATIONS http://robotics.nasa.gov/courses/fall2002/event/oct1/NASA_Robotics_20021001.htm.

* cited by examiner

*Primary Examiner* — Mary Cheung
(74) *Attorney, Agent, or Firm* — Quinn Law Group, PLLC (57) ABSTRACT

A robotic system includes a robot having joints, actuators, and sensors, and a distributed controller. The controller includes command-level controller, embedded joint-level controllers each controlling a respective joint, and a joint coordination-level controller coordinating motion of the joints. A central data library (CDL) centralizes all control and feedback data, and a user interface displays a status of each joint, actuator, and sensor using the CDL. A parameterized action sequence has a hierarchy of linked events, and allows the control data to be modified in real time. A method of controlling the robot includes transmitting control data through the various levels of the controller, routing all control and feedback data to the CDL, and displaying status and operation of the robot using the CDL. The parameterized action sequences are generated for execution by the robot, and a hierarchy of linked events is created within the sequence.

18 Claims, 4 Drawing Sheets

INTERACTIVE ROBOT CONTROL SYSTEM AND METHOD OF USE

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to motion control of a robot, and in particular to a flexible and interactive programming framework that interacts with and controls a robot in real time.

BACKGROUND OF THE INVENTION

Robots are automated devices that are able to manipulate objects using a series of mechanical links, which in turn are interconnected via articulations or motor/actuator-driven robotic joints. Each joint in a typical robot represents an independent control variable, also referred to as a degree of freedom (DOF). End-effectors are the particular links used for performing a task at hand, e.g., grasping a work tool or an object. Therefore, precise control of a robot may be organized by the level of task specification: object level control, i.e., the ability to control the behavior of an object held in a single or cooperative grasp of a robot, end-effector control, and joint level control. Collectively, the various control levels cooperate to achieve the required robotic mobility, dexterity, and work task-related functionality.

Humanoid robots in particular are robots having an approximately human structure or appearance, whether a full body, a torso, and/or an appendage, with the structural complexity of the humanoid robot being largely dependent upon the nature of the work task being performed. The use of humanoid robots may be preferred where direct interaction is required with devices or systems that are specifically made for human use. Due to the wide spectrum of work tasks that may be expected of a humanoid robot, different control modes may be simultaneously required. For example, precise control must be applied within the different spaces noted above, as well as control over the applied torque or force, motion, and the various grasp types.

The control complexity of a humanoid or other robotic system having a high number of DOF rises sharply as additional DOF are added, and therefore the underlying control processes may be extraordinarily difficult for an operator to fully understand and efficiently utilize. Adding to the difficulty is a present lack of commercially-available programming and control solutions for off the shelf use with humanoid robots having a substantial number of DOF. Likewise lacking are integrated control architectures providing for a flexible and scalable framework allowing additional technologies and robot capabilities to be easily integrated into the robotic system.

SUMMARY OF THE INVENTION

Accordingly, a framework is provided herein allowing an operator or user to interact with and precisely control a humanoid or other type of robot having multiple DOF, e.g., over 42 DOF of a particular humanoid robot as described herein. Within the scope of the invention, the framework has at least four key components: a real-time control system that is uniquely capable of independent action with respect to the robot being controlled, a configurable and self-managing communication architecture, real-time control and feedback of system status for display by a graphical user interface (GUI), and interactive programming.

In the broadest sense, the framework abstracts low-level or joint-level control complexity, and may have at its core highly complex motion, force, impedance, and other system control algorithms, so that a user of the robotic system may work with the robot in an efficient manner via an intuitive interface, i.e., the GUI. Also, interactive system development is provided that leverages the vast amount of sensory and system feedback data and graphically represents the same, thereby optimizing human control of the robot. The framework is highly flexible in the sense that it can easily accommodate future technological upgrades or modular additions.

In particular, a robotic system is provided that includes a robot and a distributed controller. The robot includes multiple robotic joints each being moveable using at least one actuator, and also includes torque, position, and/or other sensors adapted for measuring feedback data at a corresponding one of the robotic joints. The controller is adapted for controlling motion of the robotic joints by communicating control data over multiple high-speed communication networks, and includes a command-level controller for transmitting a control signal commanding a performance of an automated task by the robot, multiple embedded joint-level controllers each directly controlling motion of a respective one of the robotic joints, and a joint coordination-level controller for coordinating motion of the robotic joints in response to the control signal. The robot may include a plurality of sensors and feedback devices such as position, vision, haptic, proximity, current, voltage, and temperature sensors that collectively provide the required data and information to the controller about condition of the robot and its operating environment. The controller processes that information as part of the overall control of the robot.

The controller also includes a central data library (CDL) and a user interface. As the name implies, the CDL centralizes all control and feedback data into one location. The user interface is in electrical communication with the CDL, and displays a status of each of the robotic joints, actuators, and sensors using information from the CDL. The distributed controller displays via the user interface a parameterized action sequence having a prioritized hierarchy of linked events, as described herein, and the user interface allows a user to modify the control data in real time, i.e., during runtime and without requiring manual writing and compilation of machine-level programming code.

The robotic system is adapted for learning, and the distributed controller is adapted for constructing or adding, a new parameterized action sequence within or to the CDL by recording a series of points in Cartesian or joint space as a series of linked command blocks, for example using a graphical flow charting algorithm, as the robotic joints are manually and sequentially moved through the series of points. These sequenced actions may be interspersed with additional commands to perform a variety of activities such as activating auxiliary components, applying a reference force to an object, restarting the control system, or any other process available to the robotic system.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
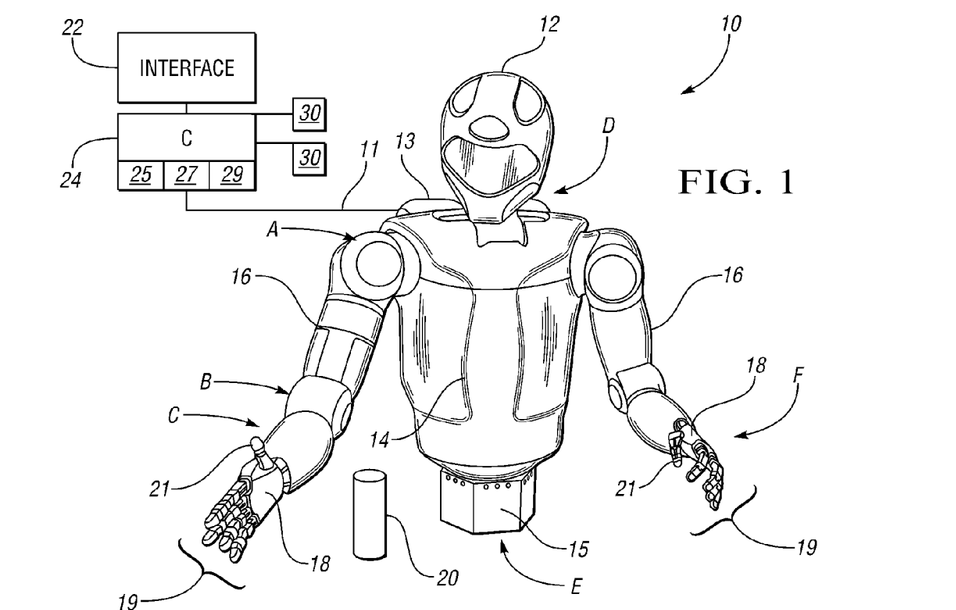
FIG. 1 is a schematic illustration of a robotic system that includes a robot and a distributed control system with interactive programming functionality in accordance with the present invention.

With reference to the drawings, wherein like reference numbers refer to the same or similar components throughout the several views, FIG. 1 shows a robotic system having a robot 10, shown here as a dexterous humanoid, that is controlled via a distributed control system or controller (C) 24. The robot 10 is adapted to perform one or more automated tasks with multiple degrees of freedom (DOF), and to perform other interactive tasks or control other integrated system components, e.g., clamping, lighting, relays, etc. According to one embodiment, the robot 10 is configured with a plurality of independently and interdependently-moveable robotic joints, such as but not limited to a shoulder joint, the position of which is generally indicated by arrow A, an elbow joint that is generally (arrow B), a wrist joint (arrow C), a neck joint (arrow D), and a waist joint (arrow E), as well as the various finger joints (arrow F) positioned between the phalanges of each robotic finger 19.

Each robotic joint may have one or more DOF. For example, certain compliant joints such as the shoulder joint (arrow A) and elbow joint (arrow B) may have at least two DOF in the form of pitch and roll. Likewise, the neck joint (arrow D) may have at least three DOF, while the waist and wrist (arrows E and C, respectively) may have one or more DOF. Depending on task complexity, the robot 10 may move with over 42 DOF. Each robotic joint contains and is internally driven by one or more actuators, e.g., joint motors, linear actuators, rotary actuators, and the like.

The robot 10 may include a head 12, torso 14, waist 15, arms 16, hands 18, fingers 19, and thumbs 21, with the various joints noted above being disposed within or therebetween. The robot 10 may also include a task-suitable fixture or base (not shown) such as legs, treads, or another moveable or fixed base depending on the particular application or intended use of the robot. A power supply 13 may be integrally mounted to the robot 10, e.g., a rechargeable battery pack carried or worn on the back of the torso 14 or another suitable energy supply, or which may be attached remotely through a tethering cable, to provide sufficient electrical energy to the various joints for movement of the same.

The distributed controller 24 provides precise motion control of the robot 10, including control over the fine and gross movements needed for manipulating an object 20 that may be grasped by the fingers 19 and thumb 21 of one or more hands 18. The controller 24 is able to independently control each robotic joint and other integrates system components in isolation from the other joints and system components, as well as to interdependently control a number of the joints to fully coordinate the actions of the multiple joints in performing a relatively complex work task.

The controller 24 may include multiple digital computers or data processing devices each having one or more microprocessors or central processing units (CPU), read only memory (ROM), random access memory (RAM), erasable electrically-programmable read only memory (EEPROM), a high-speed clock, analog-to-digital (A/D) circuitry, digital-to-analog (D/A) circuitry, and any required input/output (I/O) circuitry and devices, as well as signal conditioning and buffer electronics. Individual control algorithms resident in the controller 24 or readily accessible thereby may be stored in ROM and automatically executed at one or more different control levels to provide the respective control functionality.

The controller 24 communicates across multiple communication nodes or connection points, and over multiple high-speed communication networks, e.g., Ethernet, multi-point low-voltage differential signaling (M-LVDS) busses, backplanes, and the like. The nodes may be embodied as the various modems, hubs, bridges, computers, data routers, workstations, servers, etc. controlling the flow of information within the robotic system.

Still referring to FIG. 1, the controller 24 is distributed in the sense that command-level control is provided at a macro level, and joint coordination is provided at an intermediate level. The intermediate level in turn controls each joint or other integrated system component, e.g., relays, lighting systems, etc., involved in the control of a particular task or motion by direct communication with multiple low-level controllers. Therefore, the controller 24 may include a command-level controller referred to herein as a system commander 25, and a real-time joint-coordination controller referred to hereinafter as the brainstem 27. The controller 24 also includes multiple embedded joint-level controllers 29 which, as the description implies, are each embedded within the structure of the robot 10 in close proximity to the joint being controlled thereby. Additional controllers (not shown) may be interfaced at this low level to provide control over integrate system components like power management and/or other auxiliary devices. Control data and the feedback and control data 11 may be exchanged between the robot 10 and the various levels of the controller 24 to ensure precise complex motion control of the robot.

Controller 24 is also configured with a user interface 22, e.g., a control panel, display screen, and/or other human-machine interface (HMI) device. Interface 22 may be configured to separately facilitate restricted access to the robot 10 at the operational and the programming levels. To that end, the interface 22 may include a graphical user interface (GUI) 51, also shown in FIG. 4, providing an operator with an intuitive or menu-driven set of functional options for limited control over the robot 10.

The interface 22 may also include an un-restricted interface providing full access to the robot 10 by engineers, programmers, or other designated personnel having the authority to alter the core control code of the robot. As will now be explained with reference to FIGS. 2-5, the interface 22 works as an interactive programming gateway to present an intuitive and graphical programming layer to a programmer, operator, or other user of the robot 10, thus sufficiently hiding the substantial control complexity to facilitate efficient programming and use of the robot 10.

Still referring to FIG. 1, the controller 24 is distributed across multiple high-speed networks to provide precise control over the coordinated motion of the various joints within the robot 10. That is, the system commander 25 may be tasked via the interface 22 over a high-speed communications link to provide general high-level control over the robot 10 to the brainstem 27. For example, the system commander 25 may issue a task-based command such as "pick up an object" such as the object 20, and "move the object to point X, Y, Z in three seconds". These commands may be transmitted or relayed over a high-speed network, which in one embodiment may be an Ethernet connection or other suitable high-speed network, to a mid-level control device, i.e., the brainstem 27.

The mid-level control device or brainstem 27 receives the command from the system commander 25 and processes this command. Processing at the level of the brainstem 27 may include indentifying the specific joint or joints of the robot 10 shown in FIG. 1 that must be controlled, with any necessary auxiliary devices, to execute the requested task in the most efficient manner, as well as issuing the required activation commands to the motor or actuators controlling the one or more DOF of each joint. For example, the brainstem 27 may communicate a signal to a particular joint commanding that joint to move 10 degrees at a particular speed. This signal is transmitted to each embedded joint controller 29 via another high-speed network, e.g., a backplane integrated within the brainstem 27 and connecting various joint and/or task-specific command modules (not shown) through the M-LVDS bus.

In addition to the above devices, the controller 24 may include a collection of network communications managers (NCM) (not shown) configured to prioritize the communication between a given network and device. As will be understood by those of ordinary skill in the art, an NCM may include software that provides a programming interface to the particular hardware device attempting to connect to a network, ensuring the device may properly connect according to the particular communications protocol used by the network.

Figure 2:
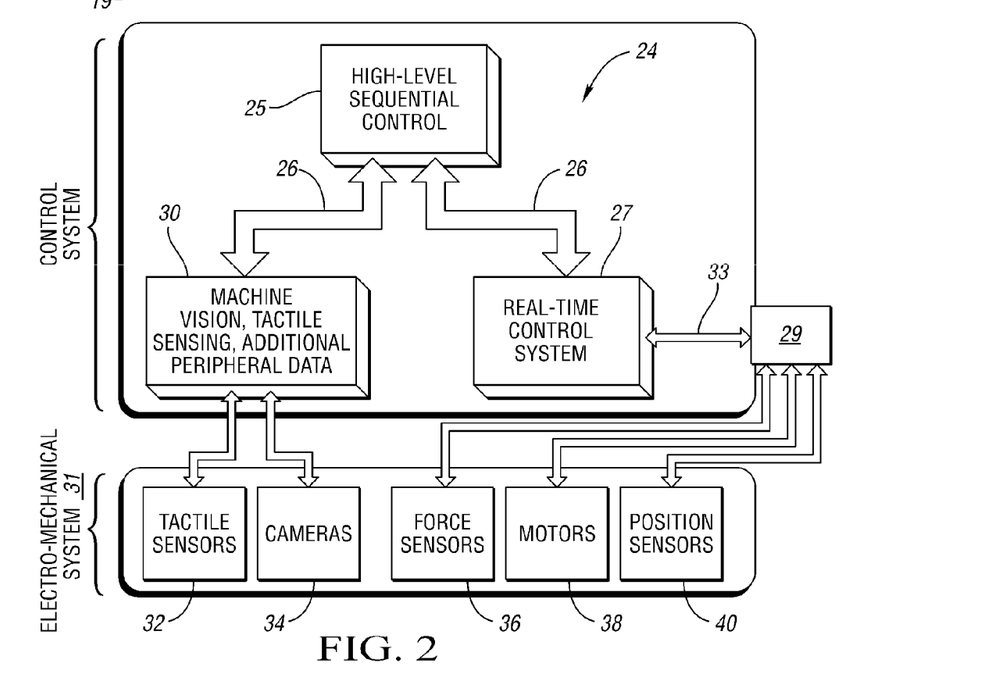
FIG. 2 is a schematic flow diagram describing information flow within the distributed control system shown in FIG. 1.

The controller 24 may also include yet another high-speed network or software that may be used to establish connectivity with multiple application modules 30 (also see FIG. 2). In one embodiment, multiple application modules 30 may be provided, with each being configured for dedicated control of a certain peripheral sensory application, e.g., haptic or touch-based sensing, vision sensing, sound or voice-based sensing, etc. Such environmental sensing capability or other control functionality enhancing the capability of the robot 10 may be relayed to the joint level of robot via the multiple high-speed networks described above.

As noted above, the controller 24 distributes control functionality between multiple control levels via the system commander 25, the brainstem 27, and the multiple embedded joint-level controllers 29. That is, the framework of the controller 24 includes high-level sequencing of predefined actions per the system commander 25, real-time control and coordination of the various joints via the brainstem 27, and joint-level processing and actuator control via the controllers 29. With respect to the controller 29, these devices may be configured as one or more printed circuit board assemblies (PCBA) providing sensing, signal processing, actuator control, and/or other functionality. These PCBA may be directly embedded within the structure of the robot 10, e.g., within the arms 16 in close proximity to a particular joint being controlled. Off-board perceptual processing may be provided via the control modules 30 noted above and shown in FIG. 2.

Referring to FIG. 2, the distributed controller 24 described above includes the interface 22 and brainstem 27, which work together to allow the robot 10 to be commanded via parameterized action sequences. The real-time controls provided by the brainstem 27 coordinate sequential actions of the various joints based on motion, force, position, impedance, etc., in a complex manner that falls outside of the intended scope of the present invention. As noted above, the controller 24 provides high-level sequential control via the system commander 25, which communicates over multiple high-speed networks 26 with the real-time control system or brainstem 27 and various perceptual data processors or command modules 30.

The command modules 30 may be embodied as workstations or processors adapted for processing support of tasks requiring the detection and processing of perceptual data, and for relaying the processed information to the various control levels of the robot 10. Two perceptual or sensing tasks that may be executed by the controller 24 via command modules 30 include visual perception and haptic perception.

As used herein, the term visual perception refers to the robot's ability to automatically find, track, and measure a plurality of features and/or objects in its field of view using an array of sensors, e.g., cameras, lasers, radar, infrared devices, or other suitable sensors. Haptic perception refers to the robot's ability to detect and process information describing contact between a surface of the robot 10, such as a surface of a hand 18 or finger 19, and an object. Contact as used herein may refer to, by way of example, any touch, force, impact, vibration, or other touch, tactile, or slip-based sensing.

As will be understood by those of ordinary skill in the art of haptic perception, touch-based sensing may include the detection and measurement of a contact force at a defined point. Tactile sensing may include detection and measurement of the spatial distribution of forces perpendicular to a sensory area of the robot, and processing/interpretation of such spatial information. A tactile-sensing array can be used to coordinate a group or series of touch sensors. Slip sensing may include the measurement and detection of any relative motion of an object relative to a sensor, e.g., movement of the object 20 of FIG. 1 relative to the hand 18 of the robot 10.

To that end, an electro-mechanical system 31 is provided within the framework of the robotic system shown in FIG. 1, i.e., the robot 10 and controller 24. For a robot 10 having both haptic and visual perception capability as described above, the system 31 may include haptic sensors 32 and vision sensors 34. For example, the haptic sensors 32 may include single or arrayed touch or tactile sensors, which may be mechanical and/or electrical in design. Exemplary mechanical sensors include binary touch sensors, potentiometers, displacement transducers, and the like. Electrical sensors may include any electrically-actuated sensors or electrically-derived values, e.g., resistive, capacitive, or magnetic/electrical field sensors. However configured, the sensors 32, 34 are in communication with a corresponding command module 30 over another high-speed network.

The electro-mechanical system 31 may also include at least one joint motor 38, or alternately a rotary or linear actuator device, per robotic joint. The joint motor 38 may be controlled at the joint level, i.e., by the various embedded joint-level controllers 29 (see FIG. 1), using force and position sensors 36 and 40, respectively. Communication occurs between the brainstem 27 and the embedded controllers 29 over another high-speed network 33, with processing of signals from the respective force and position sensors 36, 40 being conducted at the joint level apart from the brainstem 27 according to one embodiment, to enable real-time control and coordination of the various joints of robot 10 shown in FIG. 1.

Figure 3:
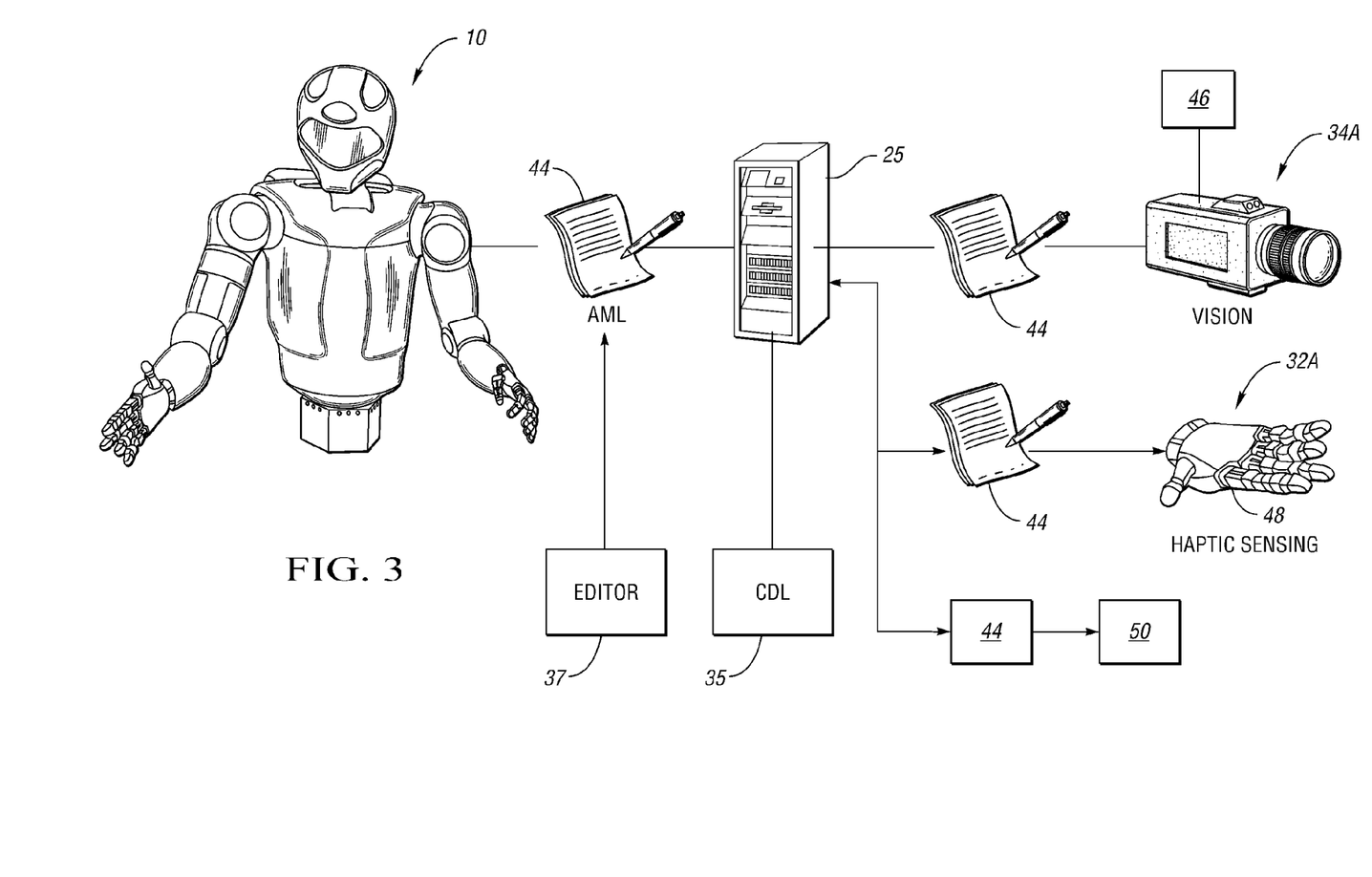
FIG. 3 is a schematic flow diagram describing an information exchange between portions of the robotic system of FIG. 2.

Referring to FIG. 3, a communication flow diagram 45 depicts, in simplified form, the flow of message-based programming information between the robot 10, the system commander 25, and the respective haptic and vision sensors 32, 34 of FIG. 2, which are represented in FIG. 3 as a camera 34A and a hand 18 with a set of tactile or haptic sensors 32A. An adaptive framework is provided within the robotic system of FIG. 1, i.e., the robot 10 and the controller 24 of FIG. 1 with all of the constituent components and sub-systems thereof. The framework allows the various communication nodes to be accessed or modified at runtime. The framework provided herein includes (a) a contract file-oriented communication model, (b) automated communication node connections, (c) multi-point node connections, and (d) centralized data management via a Central Data Library (CDL) 35. Each term will now be described in turn.

The contract file-oriented communication model allows the content of certain user-generated messages to be added or modified at runtime, without necessitating compilation in the typical manner. That is, a user can set up an information packet by defining a particular number of data pieces and what each piece of data means using a graphical editor 37. The editor 37 in turn creates a message in the form of a contract file 44. The contract file 44 may be saved in memory anywhere within the robotic system of FIG. 1 as an API Markup Language file (AML) according to one particular embodiment.

The contract file 44, as FIG. 3 can be automatically referenced by all of the communication nodes within the system. Automated connections between nodes, for example between the system commander 25 and a vision system module having the camera 34A, are also enabled via automated "handshaking" between the different nodes, as that term is understood in the art, as well as message authentication and failure communication/recovery for all of the communication nodes. With respect to failure recovery in particular, when one node stops talking to the others, the use of centralized data housed within the CDL 35 may allow the controller 24 to take immediate control action at an appropriate control level.

As used herein, the term "centralized management" refers to the automatic routing and recording in a single actual or virtual/collective location of all power, sensory, and actuator feedback and control data 11 of FIG. 1 transmitted between nodes within the robotic system. Such data may reside within the CDL 35, which in one embodiment may be a physical memory location of the system commander 25, although other memory locations or multiple, arrayed, or distributed locations may also be used without departing from the intended scope of the present invention.

An easily-expandable framework is thus provided for seamlessly integrating external perceptual and control software, e.g., vision-sensing software 46, tactile or other haptic sensing software 48, tele-operation software 50, etc., and/or other command modules and software, with the distributed control levels of controller 24. For example, as soon as new data is added to the system, the data is defined in a contract file 44. As soon as it is defined, the contract file 44 is integrated into the CDL 35. A hand 18 could be commanded to "rise to the level of the other arm, plus 10 degrees", without defining where the other arm is. The required information is already available via the CDL 35.

Figure 4:
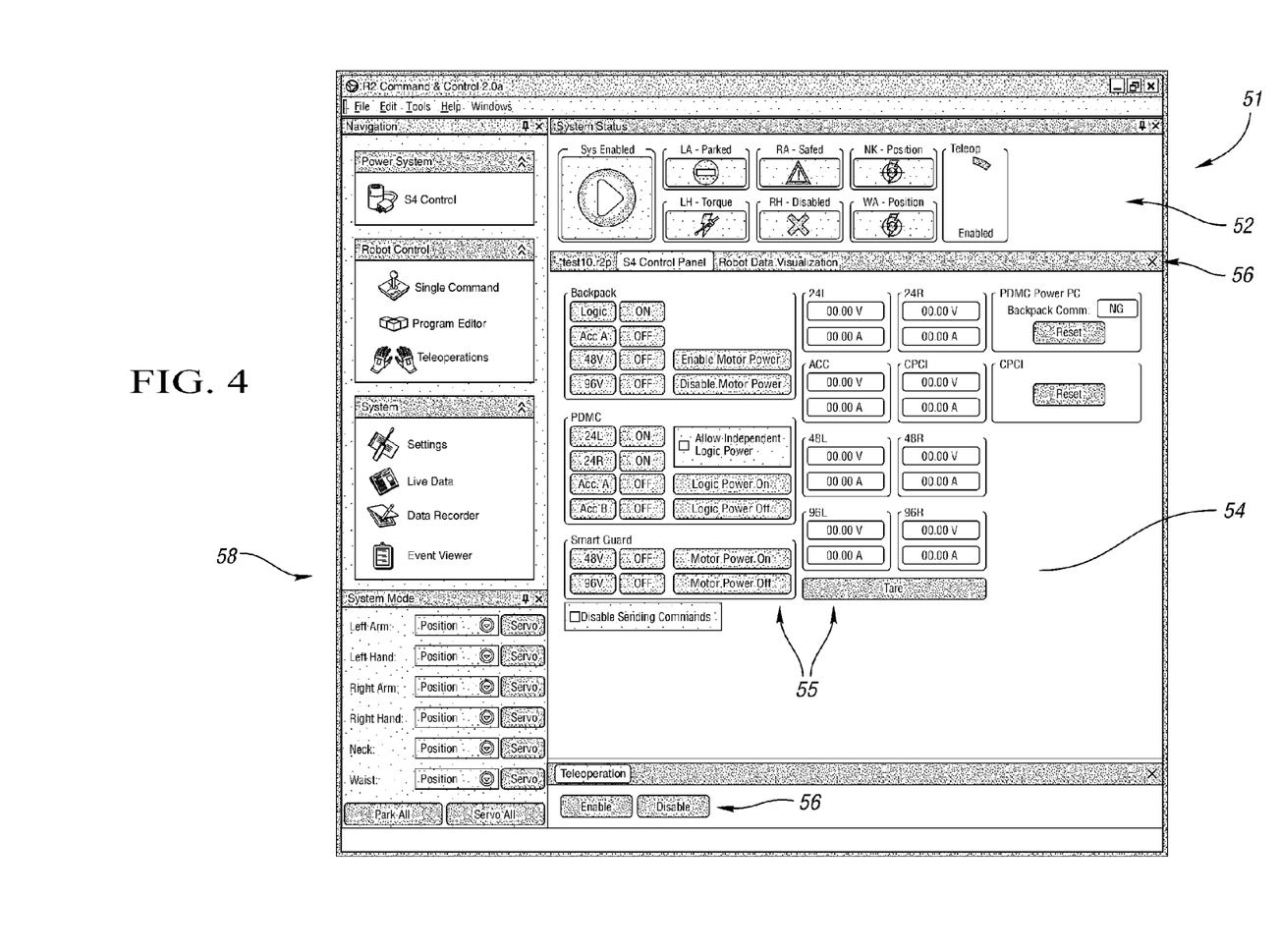
FIG. 4 is a schematic illustration of a graphical user interface (GUI) usable as part of the robotic system of FIG. 1.

Referring to FIG. 4, in order to facilitate real-time control and intuitive feedback of system status to a user or operator, the interface 22 of FIG. 1 includes a graphical control panel or user interface (GUI) 51 for intuitively and interactively accessing the data collected within the CDL 35 described above with reference to FIG. 3. The GUI 51 may be configured to provide real-time control/system status, graphical control options, and control/system data visualization capability. By abstracting the host of complex control variables and related data into a user-friendly interface device, programming access and operational efficiency of the robotic system of FIG. 1 may be optimized, enabling practical use of a high-DOF such as the 42+ DOF of the robot 10 described above.

With respect to real-time status, the GUI 51 may include a system status display 52 and a control panel display 54 allowing a user to change robot operating modes, to control system power, and to perform various other actions with the use of buttons 55 and/or other common control input elements. Status display 52 may include status icons or symbols indicating enablement of the entire robotic system, as well as of individual joint positions, torques, and/or safe states of the various joints or appendages of the robot 10, i.e., the left arm (LA), right arm (RA), neck (NK), left hand (LH), right hand (RH), waist (WA), etc. Control panel display 54 may include control icons allowing a user to select inputs to different robotic systems, such as the various power system options shown in FIG. 4, e.g., logic on/off, bus voltage availability, motor power availability, etc.

The status of individual command modules such as tele-operation software 50 of FIG. 3 may also be displayed via a command display area 56. A system mode display 58 may present a corresponding list of robot joints or appendages, with options to disable, park, enable servo control, or change the operational mode of the different joints or appendages. Multiple control menus may be selected via tabs 57 to access different types or levels of information, e.g., robot data visualization, test input data, or other input screens allowing a user to visually inspect and, if desired, to modify the run-time data library or CDL 35 described above, or to access all robot control, sensory, and external data available to the system. Updates to the CDL 35 are automatically displayed via a corresponding screen on the GUI 51.

Figure 5:
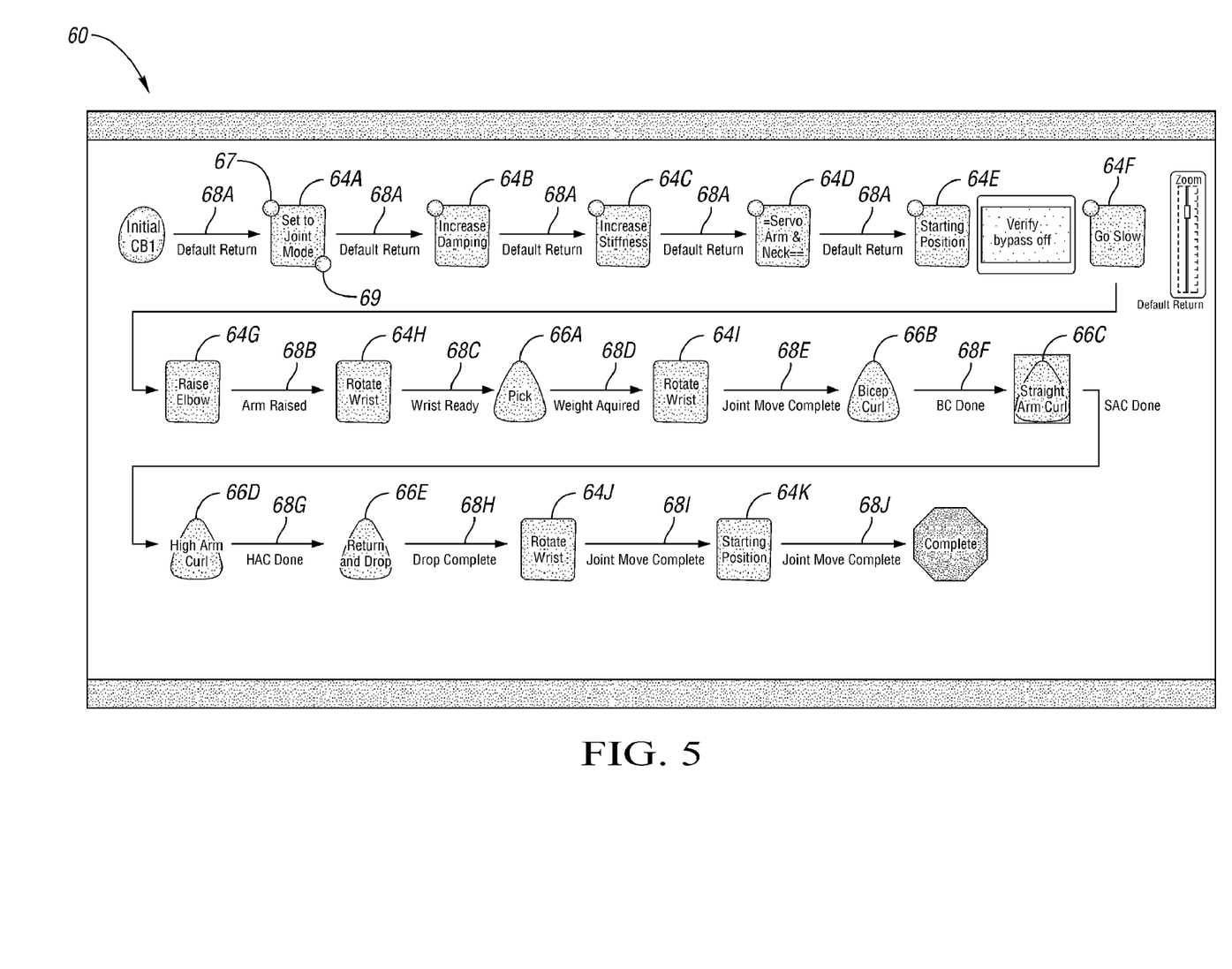
FIG. 5 is a schematic illustration of a graphical programming language usable with the robotic system of FIG. 1.

Referring to FIG. 5, the user interface 22 of FIG. 1 or a separate device may also provide access to an interactive programming framework for graphically programming and executing various parameterized task sequences. Such access may be facilitated via a programming interface. The programming interface 60 allows a user to program/train and operate the robot 10. Several design factors contribute to achieving such interactive programming capabilities, including: (a) actuator control integration, (b) use of a flowchart-style graphical programming language, (c) continuously-evaluated hierarchical task sequencing, (d) runtime expression evaluation and modification, and (e) a two-tiered programming language design. Each concept will now be explained with reference to the example flowchart 60 shown in FIG. 5.

With respect to series-elastic control integration, the system of FIG. 1 may be used to train the robot 10 in the execution of a new sequence. The robot 10 may contain at least ten compliant robotic joints within the neck, arms, waist, and hands, with parameterized stiffness achieved by means of impedance control. In one embodiment, a user may be able to select low, medium, or high levels of stiffness via the GUI 51. Then, a user can physically move the joints of the robot 10 between different Cartesian points, i.e., X, Y, and Z points in three-dimensional space. At each point, the user can build the flowchart 60 of FIG. 5 using graphical flowcharting software to create blocks 62.

Blocks 62 may be differentiated as command blocks 64A-K, sequence blocks 66A-E, and event-based links 68A-I. FIG. 5 presents an illustrative example. After initializing, block 64A may be used to symbolize setting the system to a joint training mode. Once complete, i.e., event-based link 68A, a user may increase damping and stiffness at respective blocks 68B and 68C, activating servo control of, for example, an arm and neck of the robot 10 at block 64D. The starting position or X, Y, Z coordinate of the joint is measured and recorded at block 64E, and the speed of joint movement may be set at block 64F. Blocks 64G and 64H may be used to raise an elbow a certain distance, or to rotate the waist 15 a certain degree.

Sequence blocks 66A-E used with the command blocks 64A-K describe parameterized task sequences, and as sequences necessarily include multiple steps. Clicking on a triangular sequence block may automatically open another window having yet another graphical flowchart describing the various command, sequence, and event-based links needed for that particular sequence. For example, in FIG. 5 the sequence block 66A is labeled as "pick", which refers to the robot 10 picking up an object 20. Such an action may require a single or a cooperative grasp, and is thus controlled via a series or sequence of individual joint control actions.

Other blocks in FIG. 5 complete the illustrative parameterized sequence, such as rotating the waist at block 64I, executing a high arm curl at block 66D, etc. The actual flowchart may be more or less extensive than that shown in FIG. 5. Regardless of complexity, once the task has been captured or the robot 10 trained in this manner, all of the parameterized sequential data automatically collects in the CDL 35 of FIG. 3 as described above. The sequence may then be used or modified by other users of the robot 10 as needed. This utility greatly simplifies the creation of very complex series of robot actions, and provides a unique and efficient interface facilitating the creation of robot control programs.

With respect to flowchart-style programming, and with reference to FIG. 5, the entire control system for the robot 10 of FIG. 1 may be abstracted by representing command blocks 62 on a screen of the programming interface 60. These blocks 62 may be connected graphically by arrows 64 to represent the desired sequencing. The blocks 60 can be nested within other blocks to form subroutines. These subroutines can be linked with other command blocks or nested within other subroutines. Subroutines may be arbitrarily nested and may be saved independently. These saved sequences may then be inserted into other flowcharts and eliminate costly reprogramming efforts. The blocks can be specialized to represent any component or combination of the control data available for the robot 10 of FIG. 1, thus simplifying the programming experience for the user. Additional program blocks allow the system to perform specialized actions, such as playing a sound, prompting the user, starting and stopping a timer, or other useful activities.

The system allows for the creation of program variables which can be shared across different programs. The value of these variables can be set and retrieved from inside a program and have access to the entire library of available data. Specialized blocks are used to expand the capability of the system, allowing it to perform actions like streaming a series of commands or resetting the communication system. The system also provides additional runtime interaction. A user can start, stop, and pause a program by interacting with the GUI 51.

Additionally, the system provides the ability to set breakpoints to program execution that can be automatically paused and resumed from predefined points. Breakpoints 67 are visually indicated on the respective block. The user also has the ability to modify sequencing by directly interacting with the interface, changing the connections, order, and other parameters at runtime. Current program position is indicated and the user's view will be automatically scrolled into the correct position during execution via an execution cursor 69.

With respect to continuously-evaluated sequencing, the programming language relies on the concept of completion conditions to determine sequencing priority and order. Completion conditions are fully expandable, and can represent a variety of different events and combinations. Task sequencing can be based on elapsed-time, position data, sensory data, runtime-evaluated expressions, user interaction, or other external control. For example, a joint of the robot 10 may operate in an alternating back-and-forth path for a set duration, exiting the loop when the duration condition is satisfied. The completion conditions are continuously evaluated to allow for dynamic reconfiguration of the sequence, further enhancing the interactive capability of the system. That is, conditions may be changed in runtime to exit a loop, or to modify the timing or sequence of the loop. Completion conditions are fully nestable, and can be used to create complex conditional hierarchies that may facilitate error handling, or that can be implemented as exit conditions to other sequences and/or interdependent motions of the robot 10.

With respect to runtime expression evaluation, all aspects of the programming language may be configured to support a dynamic runtime environment. Commands and task sequences are integrated with the communication architecture, centralized in the CDL 35, and through the CDL full access is provided to all sensory and command data. Program files may be created by storing or modifying the expressions that are evaluated at runtime. For example, an equation editor window may be opened via the GUI 51 to allow editing and/or viewing of the various command-level equations.

With respect to two-tiered programming language, the system generates low-level robot commands or machine code automatically via the top-level interfacing capabilities described above. The system is designed in such a way to provide flexibility and scalability. As used herein, scalability refers to the unique ability to add capabilities on the fly to the various command modules 30 without the need to write and compile machine-level code. As a result, the high-level graphical programming language described above can be completely replaced with other approaches, such as text or menu-driven interfaces, without changing the low-level programming code. Such an approach may compare in some respects to the way C++ and other high-level programming languages are compiled to low-level machine instructions or Assembly code.

While the best modes for carrying out the invention have been described in detail, those familiar with the art to which this invention relates will recognize various alternative designs and embodiments for practicing the invention within the scope of the appended claims.

The invention claimed is:

1. A robotic system comprising:
a robot having a plurality of integrated system components, including a plurality of robotic joints each being moveable using at least one of a plurality of actuators, wherein the robot includes a plurality of sensors adapted for measuring feedback data at a corresponding one of the integrated system components; and
a distributed controller adapted for controlling the integrated system components by communicating control data over multiple high-speed communication networks, wherein the distributed controller includes:
a command-level controller operable for transmitting a control signal commanding a performance of an automated task by the robot;
multiple embedded low-level controllers each adapted for directly controlling a respective one of the integrated system components;
a joint coordination-level controller adapted for coordinating control of the integrated system components in response to the control signal;

a central data library (CDL) adapted for centralizing all of the control data and feedback data;

a user interface in electrical communication with the CDL, and adapted for displaying a status of each of the robotic joints, actuators, and sensors using information from the CDL;

wherein the distributed controller displays via the user interface a parameterized action sequence having a hierarchy of linked events, and wherein the user interface allows the user to modify the parameterized action sequence via the user interface to change the control data in real time.

2. The robotic system of claim 1, further comprising a graphical editor device for creating control messages for storage in the CDL, wherein the user interface allows the content of a control message to be directly modified by the user at runtime.

3. The robotic system of claim 2, wherein the graphical editor is adapted to create the control messages in the form of an API Markup Language file (AML).

4. The robotic system of claim 1, further comprising multiple communication nodes connected to the multiple high-speed communication networks, wherein the robotic system is configured to provide at least one of: automated handshaking between the communication nodes, authentication of messages transmitted between the communication nodes, and failure recovery for each of the communication nodes.

5. The robotic system of claim 1, wherein the robotic system has multiple communication nodes, and wherein the robotic system utilizes a predetermined framework allowing the communication nodes to send to and receive data via the high-speed networks.

6. The robotic system of claim 1, wherein the controller includes a graphical flow charting algorithm, and wherein the parameterized action sequences are graphically displayed as a series of linked command blocks created using the algorithm.

7. The robotic system of claim 6, wherein the robot is configured to learn a new parameterized action sequence by manually and sequentially moving at least some of the robotic joints through a series of points in at least one of Cartesian space and joint space, and then recording each of the points as part of a corresponding one of the command blocks.

8. A distributed controller adapted for controlling the motion of a robot via control data, the controller having a plurality of robotic joints, actuators, and a plurality of sensors adapted for determining feedback data at a corresponding one of the robotic joints, and comprising:

a plurality of high-speed communication networks;

a plurality of joint-level controllers each embedded in the robot in proximity to a corresponding one of the robotic joints being controlled thereby, and each adapted for processing the feedback data from a corresponding one of the robotic joints;

a joint coordination-level controller adapted for coordinating the motion of the robotic joints via direct communication with each of the joint-level controllers;

a command-level controller adapted for transmitting a signal commanding performance of the task to the joint coordination-level controller;

a central data library (CDL) adapted for centralizing all of the control data and the feedback data; and a user interface in electrical communication with the CDL, and adapted for displaying a status of each of the robotic joints, actuators, and sensors using information from the CDL;

wherein the distributed controller displays via the user interface a parameterized action sequence having a hierarchy of linked events, and wherein the user interface allows the user to modify the parameterized action sequence via the user interface to change the control data in real time.

9. The distributed controller of claim 8, further comprising a graphical editor device for creating control messages for storage in the CDL, wherein the user interface allows the content of the control messages to be directly modified by the user at runtime.

10. The distributed controller of claim 9, wherein the graphical editor is adapted to create the message in the form of an API Markup Language file (AML).

11. The distributed controller of claim 8, further comprising multiple communication nodes connected to the multiple high-speed communication networks, wherein the robotic system is configured to provide at least one of: automated handshaking between the communication nodes, authentication of messages transmitted between the communication nodes, and failure recovery for each of the communication nodes.

12. The distributed controller of claim 8, wherein the robotic system includes multiple communications nodes, and utilizes a predetermined framework to allow the communication nodes to send to and receive data from multiple points on the high-speed networks.

13. The distributed controller of claim 8, wherein the robotic system automatically routes all changes to the feedback and control data to the CDL for immediate display on a display screen of the user interface.

14. The distributed controller of claim 8, wherein the interactive real-time programming utilizes a graphical programming language to graphically abstract all of the feedback and control data as a series of linked command blocks.

15. The distributed controller of claim 14, wherein the distributed controller is adapted for adding a new parameterized action sequence to the CDL by recording a series of points in at least one of Cartesian space and joint space as the linked command blocks as the robotic joints are manually and sequentially moved through the series of points.

16. A method of controlling a robot using a distributed controller, the method comprising:

transmitting control data through different control levels of the distributed controller to control motion of a plurality of robotic joints of the robot, the control levels including: a command-level controller adapted for transmitting a control signal commanding performance of an automated task by the robot, a joint coordination-level controller adapted for receiving the control signal and coordinating motion of at least some of the joints in response thereto, and a plurality of embedded joint-level controllers each adapted for processing the feedback data from a corresponding one of the robotic joints;

automatically routing all control and feedback data from a plurality of robotic joints, actuators, and sensors to a centralized data library (CDL);

displaying real-time graphical information describing the status and operation of the robotic joints, actuators, and sensors using information from the CDL;

generating a parameterized action sequence for execution by the robot;

creating a hierarchy of linked events within the parameterized action sequence; and executing the parameterized action sequence via a user interface that allows interaction with the user through at least one of a visual prompt and an audible prompts.

17. The method of claim 16, wherein generating the parameterized action sequence includes automatically abstracting the parameterized action sequence as a series of linked command blocks using a graphical flow charting algorithm.

18. The method of claim 16, wherein creating a hierarchy of linked events includes using calibrated completion conditions to determine sequencing priority and order.

* * * * *